(No Model.)
W. P. WALTER.
CROZING AND CHAMFERING MACHINE.
No. 437,467. Patented Sept. 30, 1890.
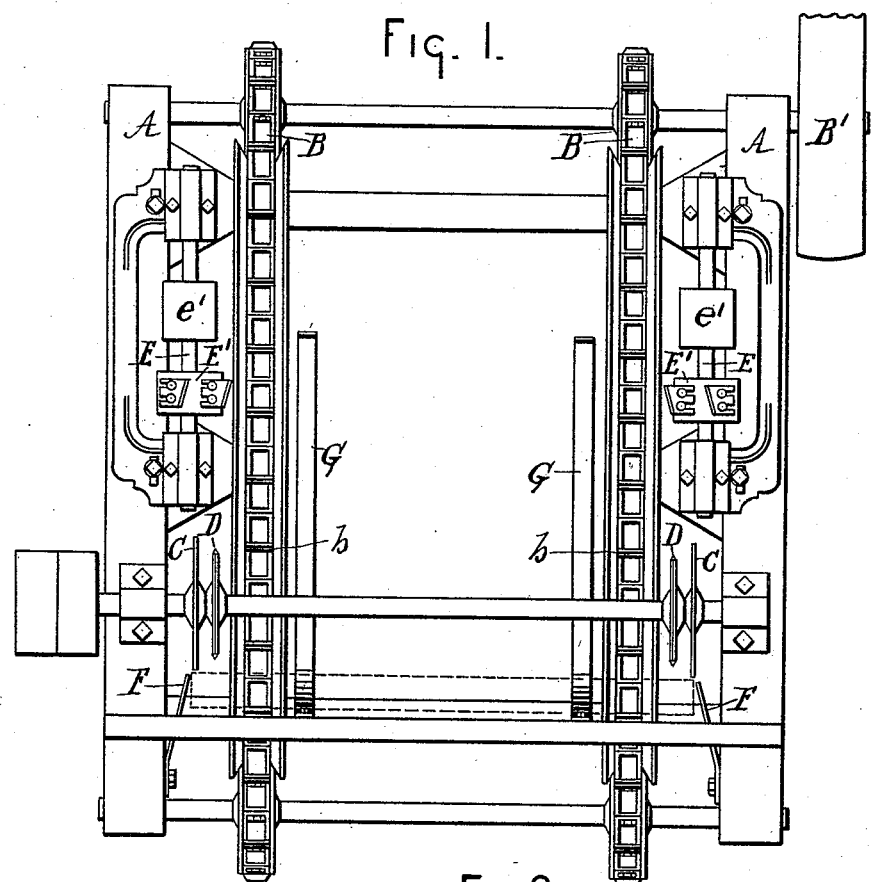
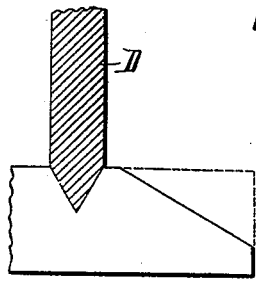
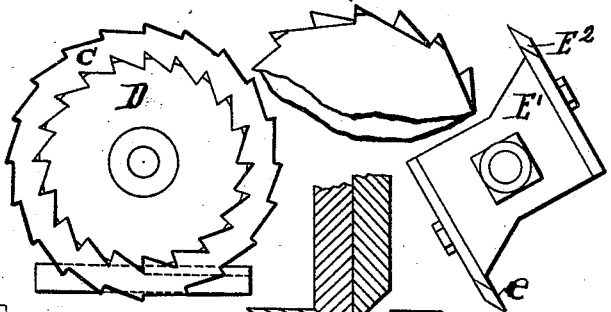
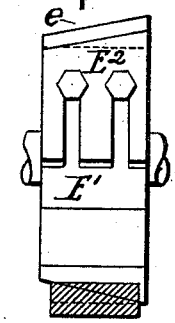
WITNESSES
W. H. Chamberlin
M. A. Reeve
INVENTOR
Will P. Walter
Wells H. Leggatt & Co
Attorneys.

UNITED STATES PATENT OFFICE.

WILL P. WALTER, OF BAY CITY, MICHIGAN, ASSIGNOR OF ONE-FOURTH TO WILLIAM L. BENHAM, OF SAME PLACE.

CROZING AND CHAMFERING MACHINE.

SPECIFICATION forming part of Letters Patent No. 437,467, dated September 30, 1890.

Application filed February 20, 1890. Serial No. 341,098. (No model.)

*To all whom it may concern:*

Be it known that I, WILL P. WALTER, a citizen of the United States, residing at Bay City, county of Bay, State of Michigan, have invented a certain new and useful Improvement in Crozing and Chamfering Machines; and I declare the following to be a full, clear, and exact description of the same, such as will enable others skilled in the art to which it pertains to make and use the same, reference being had to the accompanying drawings, which form a part of this specification.

In the drawings, Figure 1 is a plan view of a machine embodying my invention. Fig. 2 is an elevation of the saws that are employed for cutting off the ends of the staves and for crozing the same. Fig. 3 is a sectional view of the crozing-saw, showing how its teeth are shaped to make a croze-kerf. Fig. 4 is an end elevation of the chamfering-knives and the head to which they are attached. Fig. 5 is a side elevation of the same. Fig. 6 is a partial side elevation, and Fig. 7 is a vertical section, of a modified form of crozing-saw.

It is the purpose of my invention to produce a machine which will facilitate the sawing to proper length and the crozing and chamfering of barrel-staves. To this end A represents the frame of my machine. B represents continuous chain-carriers. C represents the trimming-saws whereby the stave is cut to length.

D represents the crozing-saws. These crozing-saws have their teeth dressed so as to form a V-shaped kerf, as shown in Fig. 3.

E are shafts running longitudinally of the machine, to which are attached heads E', and to these heads are fixed the chamfering-knives $E^2$. These knives $E^2$ have their edges dressed to an incline, as shown in Figs. 4 and 5 at $e$. The purpose of this inclined dressing of the knives is to cause the knives to cut deeper at one edge than the other, so that the shaving taken from the stave shall extend from a point on the surface on an incline corresponding with the dress of the knife down to the full depth of the cut. In this way there is little, if any, liability of splitting or splintering the end of the stave, and the knives work much more easily than they would if at each revolution the knife was obliged to bite in at the surface and cut directly down to the full depth of the cut in a vertical plane.

The chains B are driven by any suitable pulley or other gearing B', and the heads E' are driven by suitable pulleys or gears $e'$.

F represents springs located on both sides of the machine at the entering end. The purpose of these springs is by their action to force the entering stave to a position centrally between the two sides of the machine, so that substantially the same proportion will be trimmed off from its opposite ends.

The croze, it will be observed, is nothing more than a saw-kerf, and the whole machine, constructed as above explained, is exceedingly simple and efficient.

The chain-carriers B are provided at each link with flanges or elevations $b$, which serve to force the stave forward through the machine and to guide it with accuracy; and suitable means G are employed beneath which the staves must travel in order to hold them snugly down to a fixed level, so that the crozing-saws and chamfering-knives shall act uniformly upon each stave and different parts of the same stave.

I have herein described but one saw as being employed to form the croze, but if it is desired to have a croze wider than the kerf of a single saw, two saws may be employed, as shown in Figs. 6 and 7, and thus obviate the necessity of employing an extremely thick saw to form the wide kerf or croze.

What I claim is—

The herein described machine for crozing and chamfering staves, comprising the trimming-saws C and crozing-saws D, mounted on the same shaft, the chamfering-knives $E^2$, mounted on shafts at right angles to the saw-shaft, the endless feed-chains B for carrying the staves to the action of the saws and knives, the guide-springs F F, and the holding-down guides G G, substantially as shown and described.

In testimony whereof I sign this specification in the presence of two witnesses.

WILL P. WALTER.

Witnesses:
W. H. CHAMBERLIN,
M. A. REEVE.